United States Patent
Lee et al.

(10) Patent No.: US 10,496,589 B2
(45) Date of Patent: Dec. 3, 2019

(54) METHODS OF MANAGING INTERNAL REGISTER OF TIMING CONTROLLER AND METHODS OF OPERATING TEST DEVICE USING THE SAME

(71) Applicant: Samsung Electronics Co., Ltd., Suwon-si, Gyeonggi-do (KR)

(72) Inventors: Sang Min Lee, Seongnam-si (KR); Hyo Bae Ahn, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 159 days.

(21) Appl. No.: 15/288,736

(22) Filed: Oct. 7, 2016

(65) Prior Publication Data

US 2017/0103037 A1   Apr. 13, 2017

(30) Foreign Application Priority Data

Oct. 13, 2015   (KR) .......................... 10-2015-0143065

(51) Int. Cl.
*G06F 13/42* (2006.01)
*G06F 13/362* (2006.01)
*G06F 13/40* (2006.01)

(52) U.S. Cl.
CPC ...... *G06F 13/4282* (2013.01); *G06F 13/3625* (2013.01); *G06F 13/404* (2013.01); *G06F 13/4286* (2013.01)

(58) Field of Classification Search
CPC .................................................. G06F 11/0709
See application file for complete search history.

(56) References Cited

U.S. PATENT DOCUMENTS

| | | | |
|---|---|---|---|
| 6,914,637 B1 * | 7/2005 | Wolf | H04L 1/0057 348/473 |
| 8,380,912 B2 * | 2/2013 | Jaramillo | G09G 5/006 345/1.1 |
| 8,723,756 B2 | 5/2014 | Kim | |
| 8,797,340 B2 | 8/2014 | Slavenburg et al. | |
| 2006/0088196 A1 * | 4/2006 | Popovich, Jr. | G06T 7/001 382/128 |
| 2012/0133659 A1 | 5/2012 | Masnikosa et al. | |
| 2012/0314128 A1 * | 12/2012 | Chen | H04N 5/76 348/462 |
| 2013/0314391 A1 | 11/2013 | Jin | |

(Continued)

OTHER PUBLICATIONS

Kobayashi, Alan, "DisplayPort Technical Overview", 12.3/A. Kobayashi, White Paper 2, version 1, draft 1, Jan. 2011, 4 pages.

(Continued)

*Primary Examiner* — Henry Tsai
*Assistant Examiner* — Juanito Borromeo
(74) *Attorney, Agent, or Firm* — Myers Bigel, P.A.

(57) ABSTRACT

A method of managing an internal register of a timing controller includes receiving and analyzing a command, accessing only a first data region for storing display port configuration data through an AUX channel when the command is a native-AUX command, and accessing a second data region for storing one of first data related to an operation of the timing controller or second data related to a display driven by the timing controller through an I2C-over-AUX channel when the command is I2C-over-AUX command. Related methods of operating a test device are also disclosed.

19 Claims, 5 Drawing Sheets

(56) References Cited

U.S. PATENT DOCUMENTS

| | | |
|---|---|---|
| 2015/0012682 A1 | 1/2015 | Yang et al. |
| 2015/0042551 A1 | 2/2015 | Hsu et al. |
| 2015/0054801 A1 | 2/2015 | Seo et al. |
| 2015/0091837 A1 | 4/2015 | Srinivasan |
| 2015/0091948 A1 | 4/2015 | Kwa |
| 2015/0172590 A1 | 6/2015 | Wang et al. |
| 2015/0187300 A1 | 7/2015 | Sun et al. |

OTHER PUBLICATIONS

NXP Semiconductors N.V., Product Data Sheet—"PTN3392 2-lane DisplayPort to VGA adapter IC", Rev. 5—Jun. 5, 2014, 32 pp.
Parade Technologies Inc., "PS171 DisplayPort™ to HDMI/DVI Converter with HDMI 1.4a 3.0 Gbps Support, Version 0.9", Jan. 31, 2012, 35 pp.
STMicroelectronics, Data brief—STDP4028—DisplayPort Transmitter, Doc ID 15886 Rev 1, Sep. 2010, 7 pp.

\* cited by examiner

METHODS OF MANAGING INTERNAL REGISTER OF TIMING CONTROLLER AND METHODS OF OPERATING TEST DEVICE USING THE SAME

CROSS-REFERENCE TO RELATED APPLICATION

This application claims priority under 35 U.S.C. § 119 from Korean Patent Application No. 10-2015-0143065 filed on Oct. 13, 2015, the disclosure of which is hereby incorporated by reference in its entirety.

BACKGROUND

Embodiments of the present inventive concepts relate to methods of managing a timing controller, and more particularly, to methods of managing a timing controller using an AUX channel of a display port.

The timing controller is a semiconductor device which receives display data from a system interface, processes the display data to be suitable for a Thin Film Transistor-Liquid Crystal Display (TFT-LCD) panel of a TFT-LCD module and/or other display, and generates a control signal for controlling a source driver and a gate driver included in the TFT-LCD module.

Data for the operation of the timing controller and characteristics of a display panel are stored in the timing controller. It may be desirable to connect to an internal register of the timing controller to update the data. However, when the timing controller is included in the TFT-LCD module, the timing controller may need to be disassembled from the TFT-LCD module to update data stored in the internal register. In addition, when an operation of updating the data stored in the internal register is completed, the timing controller may need to be reassembled in the TFT-LCD module.

SUMMARY

Various embodiments described herein can provide methods of managing an internal register of a timing controller through an auxiliary (AUX) channel of a display port that can reduce or eliminate the need to disassemble the timing controller from a TFT-LCD module and re-assemble the timing controller in the TFT-LCD module in a process of updating data stored in the internal register of the timing controller. Methods of operating a test device capable of using the above described methods may also be provided.

Example embodiments of the present inventive concepts are directed to a method of managing an internal register of a timing controller, the method including receiving and analyzing a command, accessing only a first data region of the internal register that is configured to store display port configuration data through an auxiliary (AUX) channel responsive to the command being a native-AUX command, and accessing a second data region of the internal register that is configured to store one of first data related to an operation of the timing controller through an inter integrated circuit (I2C)-over-AUX channel or second data related to a display driven by the timing controller responsive to the command being an I2C-over-AUX command.

In some embodiments, the command is transmitted to the timing controller through the AUX channel included in a display port. In some embodiments, responsive to the command being the I2C-over-AUX command, accessing a third data region of the internal register that is configured to store the other of the first data or the second data through the I2C-over-AUX channel is further included. The command includes address bits configured to classify the second data region and the third data region in some embodiments.

The second data region and the third data region are included in a different memory device in some embodiments.

Some of the address bits represent a start address of a data region to be accessed among the second data region and the third data region in some embodiments.

The second data region and the third data region are included in a same memory device in some embodiments.

In some embodiments, in response to the command being the I2C-over-AUX command, the method further comprises transmitting, by a command analyzer, the command to an AUX-I2C converter, and converting, by the AUX-I2C converter, the command from an AUX format into an I2C format and transmitting the command to a data region to be accessed.

Other example embodiments of the present inventive concepts are directed to a method of operating a test device to control operation of a timing controller. The method includes activating a graphical user interface GUI configured to execute an I2C-over-AUX command using an operating system OS in the test device, receiving, by the OS, input data through the GUI, and updating, by the OS, one of first data related to the operation of the timing controller or second data related to a display driven by the timing controller through an I2C-over-AUX channel.

In some embodiments, each of a first data region configured to store the first data and a second data region configured to store the second data is included in a different memory device. The input data includes addresses and data, and the addresses include a device address configured to classify the first data region and the second data region. The first data region for storing the first data and the second data region for storing the second data are included in the same memory device in some embodiments.

Transmitting, by the OS, a command corresponding to the input data to the timing controller through an AUX channel of a display port is further provided in some embodiments.

Analyzing, by a command analyzer, the input data and transmitting the input data to an AUX-I2C converter, and converting, by the AUX-I2C converter, the input data from an AUX format into an I2C format and transmitting the input data to a data region including data to be updated are further included in some embodiments. Updating, by the OS, the other of the first data or the second data through the I2C-over-AUX channel is further included in some embodiments.

Yet other example embodiments of the present inventive concepts are directed to a method of accessing an internal register of a timing controller that is connected to a display port by an auxiliary (AUX) channel, the method comprising selectively accessing the internal register of the timing controller using an inter integrated circuit (I2C) bus, responsive to receiving an I2C command over the AUX channel.

In some embodiments, the selectively accessing comprises selectively storing data related to an operation of the timing controller and data related to a display driven by the timing controller in the internal register of the timing controller using the I2C bus, responsive to the receiving the I2C command over the AUX channel.

In other embodiments, the selectively accessing comprises selectively converting the I2C command that is received over the AUX channel from an AUX format to an I2C format, responsive to the receiving the I2C command over the AUX channel.

In other embodiments, the method further comprises selectively accessing the internal register of the timing controller using the AUX channel, responsive to receiving a native-AUX command over the AUX channel.

In still other embodiments, the internal register of the timing controller comprises a display port configuration data (DPCD) register.

BRIEF DESCRIPTION OF THE DRAWINGS

These and/or other aspects and advantages of the present inventive concepts will become apparent and more readily appreciated from the following description of the embodiments, taken in conjunction with the accompanying drawings of which.

DETAILED DESCRIPTION OF THE EMBODIMENTS

The advantages and features of the inventive concepts and methods of achieving the advantages and features will be described more fully with reference to the accompanying drawings, in which example embodiments of the inventive concepts are shown.

The inventive concepts may, however, be embodied in many different forms and should not be construed as being limited to the embodiments set forth herein; rather these embodiments are provided so that this disclosure will be thorough and complete, and will fully convey the inventive concepts to one of ordinary skill in the art. It should be understood, however, that there is no intent to limit example embodiments of the inventive concepts to the particular forms disclosed, but conversely, example embodiments of the inventive concepts are to cover all modifications, equivalents, and alternatives falling within the spirit and scope of the inventive concepts. Like reference numerals denote like elements in the drawings. In the attached drawings, sizes of structures may be exaggerated for clarity.

The terminology used herein is for the purpose of describing example embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, components, or combinations thereof, but do not preclude the presence or addition of one or more other features, integers, steps, operations, elements, components, or combinations thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An auxiliary (AUX) channel AUX CH herein may refer to a half duplex bi-directional channel used in a link management and a device control among a plurality of channels included in a display port. Accordingly, an AUX protocol may refer to a protocol used in the AUX channel and an AUX format may refer to a configuration of bit(s) used in the AUX channel.

An inter integrated circuit (I2C) bus herein may refer to a communication protocol which includes a serial clock SCL line and a serial data SDA line, and is used in a communication between a microprocessor and a low speed peripheral. The I2C bus herein may refer to an I2C bus. In addition, the I2C protocol herein may refer to a protocol used in the I2C bus, and an I2C format may refer to a bit configuration used in the I2C bus.

An I2C-over-AUX channel herein may refer to a data transfer route for transmitting data transmitted to the AUX channel to a destination through the I2C bus.

Figure 1:
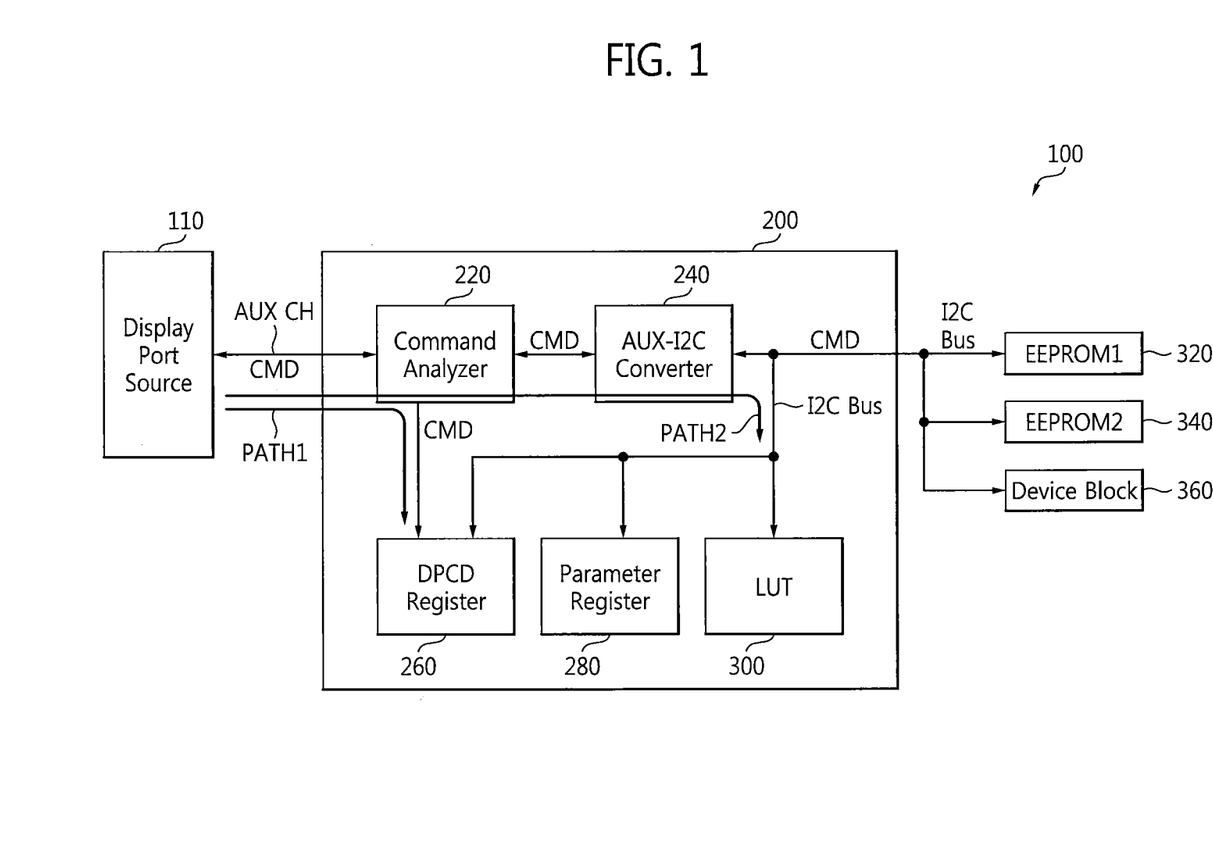
FIG. 1 is a block diagram of a display port communication system/method according to embodiments of the present inventive concepts.

FIG. 1 is a block diagram of a display port communication system and method according to embodiments of the present inventive concepts. Referring to FIG. 1, a display port transmission system/method 100 may include a display port source 110, a timing controller 200, a first memory 320, a second memory 340, and a device block 360.

The display port source 110 may be connected to the timing controller 200 through an AUX channel AUX CH. The display port source 110 may transmit a command CMD to the timing controller 200 through the AUX channel AUX CH. The display port source 110 may be embodied in a test device.

The timing controller 200 may include a command analyzer 220, an AUX-I2C converter 240, a display port configuration data (DPCD) register 260, a parameter register 280, and a look up table (LUT) 300.

The command analyzer 220 may receive a command CMD transmitted from the display port source 110 through the AUX channel AUX CH and analyze the received command CMD. The command analyzer 220 may be directly connected to the DPCD register 260, and may be connected to the DPCD register 260, the parameter register 280, or the LUT 300 through the AUX-I2C converter 240.

The command analyzer 220 may transmit the command CMD to a different path PATH1 or PATH2 according to a result of the analysis. According to some embodiments, when the command CMD is a native-AUX command, the command analyzer 220 may transmit the command CMD to the DPCD register 260 through a first path PATH1, and when the command CMD is an I2C-over-AUX command, the command analyzer 220 may transmit the command CMD to one of the DPCD register 260, the parameter register 280, and the LUT 300 through a second path PATH2. Stated differently, an internal register of the timing controller 200 is selectively accessed using an I2C bus, responsive to receiving an I2C command over the AUX channel. The internal register of the timing controller is also selectively accessed using the AUX channel, responsive to receiving a native-AUX command over the AUX channel.

The first path PATH1 may refer to a path in which a command CMD transmitted through the AUX channel AUX CH of the display port is directly connected to the DPCD register 260 through the command analyzer 220. The second path PATH2 may refer to a path in which the command CMD transmitted through the AUX channel AUX CH of the display port is transmitted to the DPCD register 260, the parameter register 280, or the LUT 300 through the command analyzer 220 and the AUX-I2C converter 240.

The AUX-I2C converter 240 may convert a format of the command CMD received from the command analyzer 220 from an AUX format into an I2C format. In other words, the I2C command that is received over the AUX channel is selectively converted from an AUX format to an I2C format, responsive to receiving the I2C command over the AUX channel. The AUX-I2C converter 240 may output the command CMD to the DPCD register 260, the parameter register 280, or the LUT 300 according to address bits included in the command CMD. The DPCD register 260 may store display port configuration data.

The parameter register 280 may be configured to store data for the operations of the timing controller 200. The LUT 300 may be configured to store output values corresponding to an input display signal according to RGB characteristics of a display. The first memory 320 may be configured to store information on the resolution of a display. The first memory 320 may be embodied in an electrically erasable programmable read-only memory (EEPROM). The second memory 340 may be configured to store data stored in the parameter register 280 and data stored in the LUT 300. The second memory 340 may be embodied in an EEPROM. The timing controller 200 may be configured to load some of data stored in the second memory 330 from the second memory 330 according to a displayed frame.

The device block 360 may include a plurality of devices. The plurality of devices may include a motion sensor device, a temperature sensor device, a touch sensor device and/or other device(s). The plurality of devices may receive a control signal from the timing controller 200 through the I2C bus.

Figure 2:
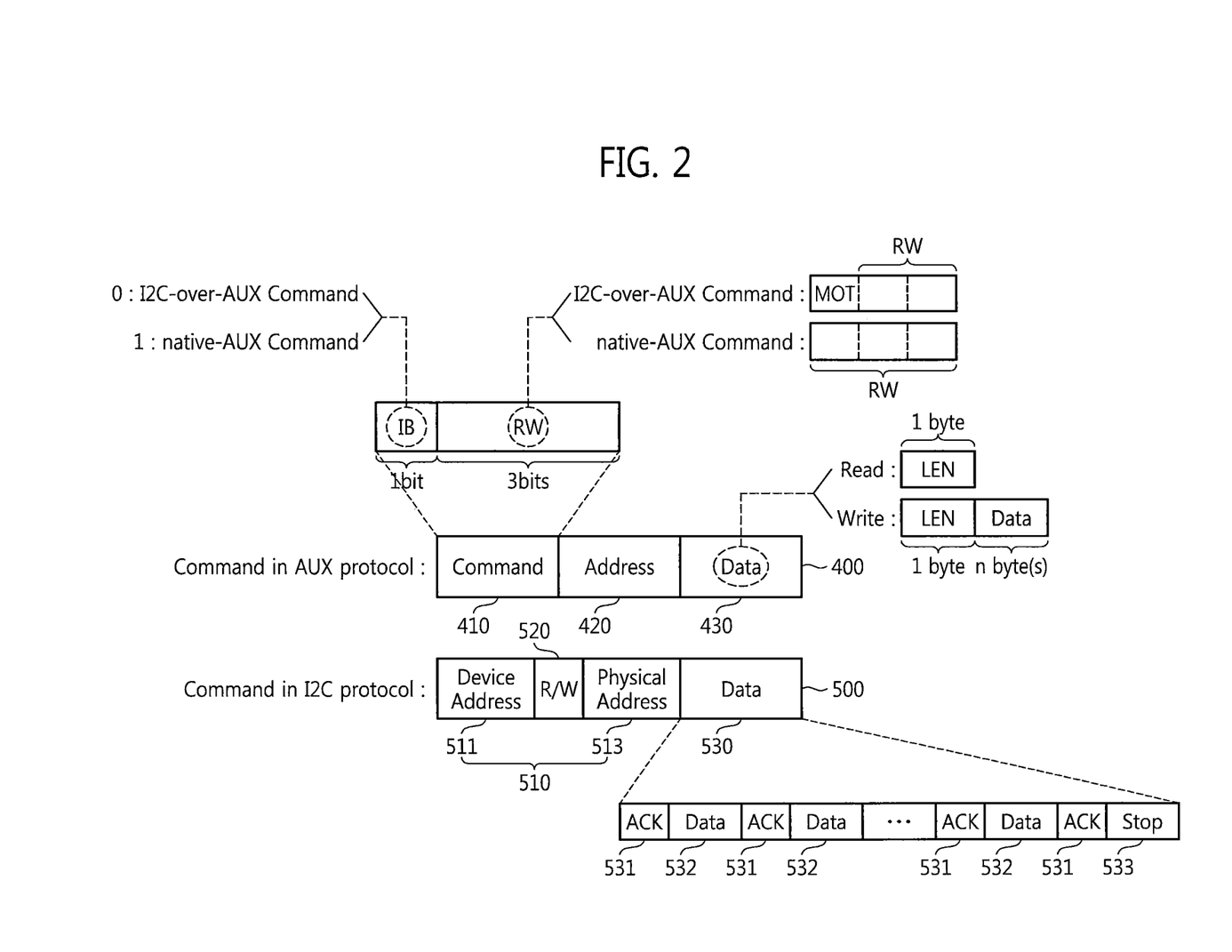
FIG. 2 is a drawing which shows a bit configuration of a command transmitted through an AUX channel of a display port according to embodiments of the present inventive concepts.

FIG. 2 is a drawing which shows a bit configuration of a command transmitted through an AUX channel of a display port according to embodiments of the present inventive concepts. Referring to FIGS. 1 and 2, the configuration of bits included in a command CMD may be changed according to a type of a protocol.

When a command 400 is transmitted through the AUX channel AUX CH using an AUX protocol, the command 400 may include command bits 410, address bits 420, and data bits 430. According to some embodiments, the size of the command bits 410 may be four bits, the size of the address bits 420 may be 20 bits, and the data bits 430 may be one byte (eight bits) or more.

When the command 400 is transmitted through the AUX channel using an AUX protocol, the command bits 410 may include an identification bit (IB). The size of the identification bit (IB) may be one bit. According to some embodiments, when the identification bit (IB) is a logic 0, the command CMD may represent an I2C-over-AUX command, and when the identification bit (IB) is a logic 1, the command CMD may represent a native-AUX command.

When the command CMD is the I2C-over-AUX command, the command bits 410 may include a middle-of-transaction (MOT) bit MOT of a one bit size, and read/write bits RW of a two bit size. The MOT bit MOT may represent whether or not the command CMD currently continues to be transmitted. When the command CMD is the native-AUX command, the command bits 410 may include read/write bits RW of a three bit size.

The address bits 420 may represent an address of a device on which a read operation or a write operation is performed among the DPCD register 260, the parameter register 280, the LUT 300, the first memory 320, the second memory 340, and the device block 360.

When the read operation is performed, the data bits 430 may represent the length LEN of an address on which a read command is performed. The size of the data bits 430 may be one byte; however, it is not limited thereto. When the write operation is performed, the data bits 430 may include the length LEN of an address on which a write command is performed and write data. The size of the length LEN of the address may be one byte, and the size of the write data may be n bytes, where n is a natural number.

In addition, when a command 500 is transmitted through an I2C bus using an I2C protocol, the command CMD may include address bits 510, read/write bits 520, and data bits 530.

The address bits 510 may include a device address 511 and a physical address 513. The device address 511 may refer to an address designating one of the DPCD register 260, the parameter register 280, the LUT 300, the first memory 320, the second memory 340, and the device block 360.

According to some embodiments, when two or more of the DPCD register 260, the parameter register 280, the LUT 300, the first memory 320, the second memory 340, and the device block 360 are included in a same device, the device address 511 may be an address designating the device.

The physical address 513 may refer to an address of a portion of a device designated by the device address 511, on which a write operation or a read operation is performed. According to some embodiments, the address bits 510 may represent a type of address. In a case as described above, the address bits 510 may represent an internal address of one of the DPCD register 260, the parameter register 280, the LUT 300, the first memory 320, the second memory 340, and the device block 360. According to some embodiments, a size of the address bits 510 may be seven bits; however, it is not limited thereto.

The read/write bit(s) 520 may represent whether to perform a read operation or to perform a write operation. The size of the read/write bit(s) 520 may be one bit or more.

The data bits 530 may include two or more ACK bits 531, one or more data bits 532, and one stop bit. The size of the ACK bit 531 may be one bit. The size of the data bits 532 may be one byte. The size of the stop bit 533 may be one bit.

The ACK bit 531 may include a bit for checking whether transmission or reception is correctly performed. The stop bit 533 may include a bit which represents an end of the transmission or the reception.

Figure 3A:
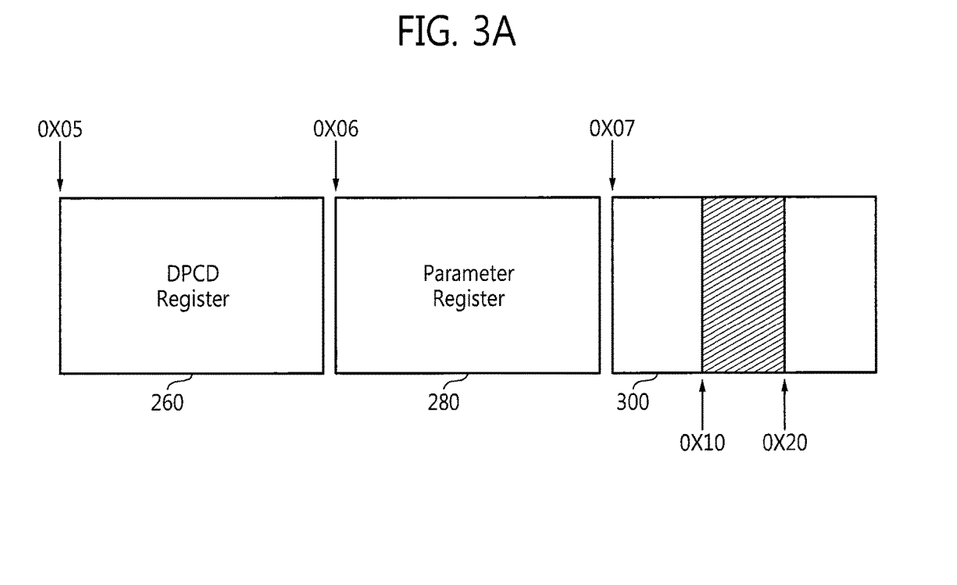
FIG. 3A is a drawing which shows the addresses of a DPCD register, a parameter register, and a LUT shown in FIG. 1 according to embodiments of the present inventive concepts.
Figure 3B:
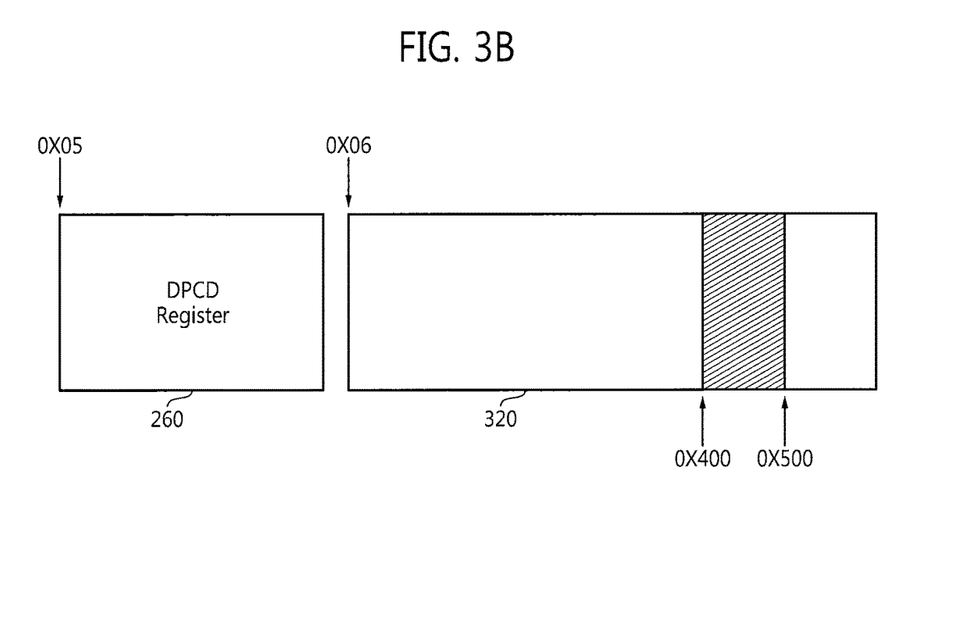
FIG. 3B is a drawing which shows the addresses of the DPCD register, the parameter register, and the LUT shown in FIG. 1 according to embodiments of the present inventive concepts.

FIG. 3A is a drawing which shows the addresses of the DPCD register, the parameter register, and the LUT shown in FIG. 1 according to an embodiment of the present inventive concepts, and FIG. 3B is a drawing which shows the addresses of the DPCD register, the parameter register, and the LUT shown in FIG. 1 according to an embodiment of the present inventive concepts.

Referring to FIG. 3A, each of the DPCD 260, the parameter register 280, and the LUT 300 may be included in a different device. It is assumed that the device address 511 of the DPCD 260 is 0X05, the device address 511 of the parameter register 280 is 0X06, and the device address 511 of the LUT 300 is 0X07. Moreover, it is assumed that the physical address 513 to be accessed is 0X100 to 0X200.

When a device to be accessed is the LUT 300, the device address 511 among the address bits 510 may be an address corresponding to 0X07. In addition, the physical address 513 among the address bits 510 may be an address corresponding to 0X100 to 0X200. The physical address 513 may include 0X100 and 0X200, or may include 0X100 and 100 (or 0X100) which is the length of an address to be accessed.

Referring to FIG. 3B, the parameter register 280 and the LUT 300 may be included in a same device. It is assumed that the device address 511 of the DPCD 260 is 0X05, the device address 511 of a device 320 including the parameter register 280 and the LUT 300 is 0X06. Moreover, it is assumed that the physical address 513 to be accessed is 0X400 to 0X500.

When the device to be accessed is the LUT 300, the device address 511 among the address bits 510 may be an address corresponding to 0X06 which is the device address 511 of the device 320 including the parameter register 280 and the LUT 300. In addition, the physical address 513 among the address bits 510 may be an address corresponding to 0X400 to 0X500. The physical address 513 may include 0X400 and 0X500, or may include 0X400 and 100 (or 0X100) which is the length of an address to be accessed.

Referring to FIGS. 3A and 3B, even if portions to be accessed in the LUT 300 are the same as each other, the physical address of the portion to be accessed may be changed according to whether the LUT 300 and other registers are included in the same device.

Figure 4:
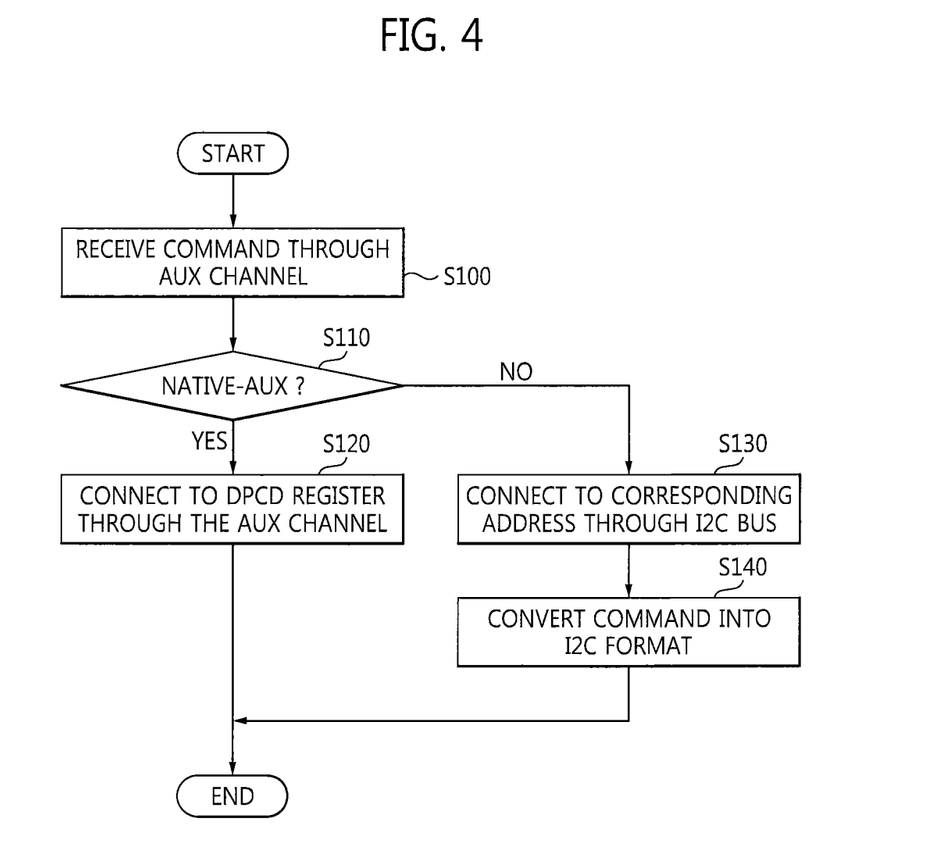
FIG. 4 is a flowchart which shows operations that may be performed by the timing controller shown in FIG. 1.

FIG. 4 is a flowchart which shows operations that may be performed by the timing controller shown in FIG. 1 according to some embodiments of the present inventive concepts. Referring to FIG. 4, the timing controller 200 may receive a command CMD through the AUX channel AUX CH (S100). The command analyzer 200 may analyze the received command CMD and determine a transmission path according to a result of the analysis (S110). When the command CMD is a native-AUX command, the timing controller 200 may access the DPCD register 260 through the AUX channel AUX CH (S120).

When the command CMD is an I2C-over-AUX command, the command analyzer 220 may transmit the received command CMD to the AUX-I2C converter 240, and the AUX-I2C converter 240 may convert the command CMD from an AUX format into an I2C format (S130). The AUX-I2C converter 240 may transmit the command CMD converted into the I2C format to a corresponding address of a device to be accessed (S140). Accordingly, FIG. 4 illustrates various embodiments of selectively accessing the internal register of the timing controller using an I2C bus, responsive to receiving an I2C command over the AUX channel.

Figure 5:
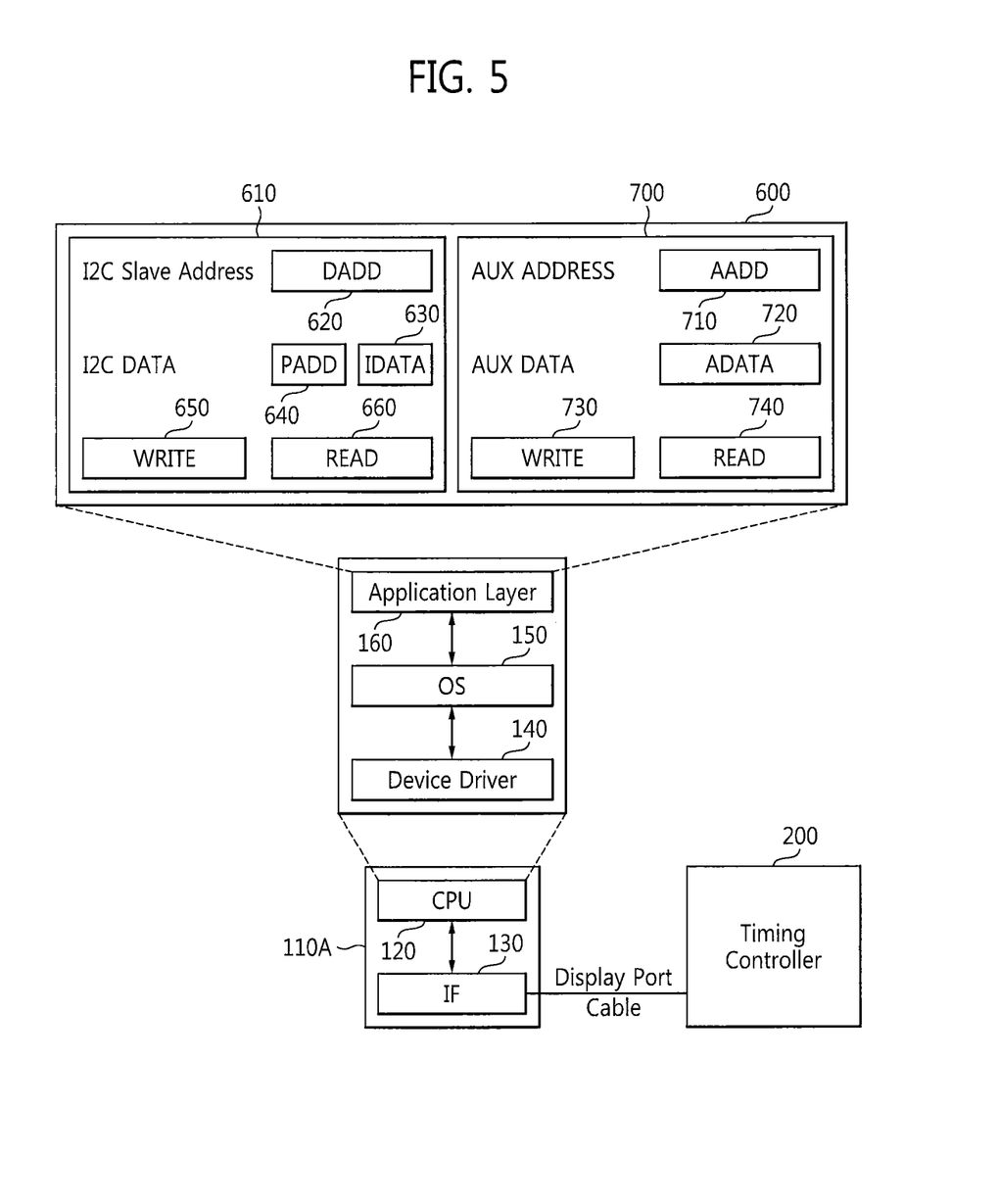
FIG. 5 is a block diagram of a test device/method according to embodiments of the present inventive concepts.

FIG. 5 is a block diagram of a test device according to some embodiments of the present inventive concepts. Referring to FIG. 5, a test device 110A may include a central processing unit (CPU) 120 and an interface 130.

The CPU 120 may generally control the operation of the test device 110A. The CPU 120 may include a processor. The CPU 120 may transmit a command to the timing controller 200 through the interface 130. The CPU 120 may include a device driver 140, an operating system (OS) 150, and an application layer 160.

The device driver 140 may transmit data for a driving of the OS 150 to the OS 150. The OS 150 may control the execution of a program 600 loaded to an application layer 160.

The application layer 160 may be loaded with the program 600 so that the program 600 may be executed, and may execute the program 600. The program 600 may include a first graphical user interface (GUI) 610 and a second GUI. The first GUI 610 may include a device address input block 620, a physical address input block 640, a first data input block 630, a write button 650, and a read button 660.

Data DADD input to the device address input block 620 may be data corresponding to the device address 511. Data PADD input to the physical address input block 640 may be data corresponding to the physical address 513.

Data IDATA input through the first data input block 630 may be data corresponding to the data bits 530. When the write button 650 is selected, a write operation of writing the data IDATA in a memory region 260, 280, or 300 determined according to the data DADD and the data PADD may be performed, and when the read button 660 is selected, a read operation of reading data from the memory region 260, 280, or 300 determined according to the data DADD and the data PADD may be performed.

The second GUI 700 may include an address input block 710, a second data input block 720, a write button 730, and a read button 740.

Data AADD input to the address input block 710 may be data corresponding to address bits 420. Data ADATA input through the second data input block 720 may be data corresponding to data bits 430. When the write button 730 is selected, a write operation may be performed, and when the read button 740 is selected, a read operation may be performed.

Methods of managing an internal register of a timing controller according to various embodiments of the present inventive concepts can reduce or eliminate the need to disassemble the timing controller from a TFT-LCD module and re-assemble the timing controller in the TFT-LCD module in a process of updating data stored in the internal register. The methods can allow access to the internal register without the need for additional equipment, which can save costs and/or time in development, evaluation, and/or manufacture.

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a few embodiments of the present inventive concepts have been shown and described, it will be appreciated by those skilled in the art that changes may be made in these embodiments without departing from the principles and spirit of the inventive concepts, the scope of which is defined in the appended claims and their equivalents.

What is claimed is:

1. A method of managing an internal register of a timing controller comprising:
   receiving and analyzing a command;
   accessing, independently of an inter integrated circuit (I2C) bus, only a first data region of the internal register that is configured to store display port configuration data through an auxiliary (AUX) channel responsive to the command being a native-AUX command;
   converting the command from an AUX format into an I2C format, and transmitting, via the I2C bus, the command to a second data region or a third data region of the internal register; and
   accessing, via the I2C bus, the second data region of the internal register that is configured to store one of first data related to operation of the timing controller or second data related to a display driven by the timing controller through an I2C-over-AUX channel responsive to the command being an I2C-over-AUX command.

2. The method of claim 1, wherein the command is transmitted to the timing controller through the AUX channel included in a display port.

3. The method of claim 1, further comprising, responsive to the command being the I2C-over-AUX command, accessing the third data region of the internal register that is configured to store the other a different one of the first data or the second data through the I2C-over-AUX channel.

4. The method of claim 3, wherein the command includes address bits configured to classify the second data region and the third data region.

5. The method of claim 4, wherein the second data region and the third data region are included in different memory regions.

6. The method of claim 5, wherein some of the address bits represent a start address of a data region to be accessed among the second data region and the third data region.

7. The method of claim 3, wherein the second data region and the third data region are included in a same memory device.

8. The method of claim 3, the command being the I2C-over-AUX command, the method further comprises:
   transmitting, by a command analyzer, the command to an AUX-I2C converter,
   wherein the converting comprises converting, by the AUX-I2C converter, the command from the AUX format into the I2C format, and transmitting, via the I2C bus, the command from the AUX-I2C converter to the second data region or the third data region.

9. A method of operating a test device to control operation of a timing controller, the method comprising:
   activating a graphical user interface (GUI) configured to execute an I2C-over-AUX command using an operating system (OS) in the test device;
   receiving, by the OS, input data through the GUI;
   analyzing, by a command analyzer, the input data and transmitting the input data from the command analyzer to an AUX-I2C converter;
   converting, by the AUX-I2C converter, the input data from an AUX format into an I2C format, and transmitting the input data in the I2C format from the AUX-I2C converter to a data region of the timing controller including data to be updated; and
   updating, by the OS, one of first data related to the operation of the timing controller or second data related to a display driven by the timing controller through an I2C-over-AUX channel.

10. The method of claim 9,
    wherein the data region comprises a first data region configured to store the first data or a second data region configured to store the second data,
    wherein each of the first data region configured to store the first data and the second data region configured to store the second data is included in a separate memory device, and wherein the input data includes addresses and data, and the addresses include a device address configured to classify the first data region and the second data region.

11. The method of claim 9,
wherein the data region comprises a first data region configured to store the first data or a second data region configured to store the second data, and
wherein the first data region configured to store the first data and the second data region configured to store the second data are both included in a same memory device.

12. The method of claim 9, further comprising transmitting, by the OS, a command corresponding to the input data to the timing controller through an AUX channel of a display port.

13. The method of claim 9, further comprising updating, by the OS, a different one of the first data or the second data through the I2C-over-AUX channel.

14. A method of accessing an internal register of a timing controller that is connected to a display port by an auxiliary (AUX) channel, the method comprising:
    selectively accessing the internal register of the timing controller using an inter integrated circuit (I2C) bus, responsive to receiving an I2C command over the AUX channel,
    wherein the selectively accessing comprises using the timing controller to:
        convert the I2C command that is received over the AUX channel from an AUX format to an I2C format, responsive to the receiving the I2C command over the AUX channel; and
        transmit the I2C command in the I2C format to the internal register of the timing controller via the I2C bus,
    wherein the internal register of the timing controller stores:
        data related to operation of the timing controller; or
        output values corresponding to an input display signal according to RGB characteristics of a display, and
    wherein the using the timing controller to transmit the I2C command comprises updating, via the I2C bus, the data related to operation of the timing controller or the output values corresponding to the input display signal according to RGB characteristics of the display.

15. The method of claim 14 wherein the selectively accessing comprises selectively storing the data related to the operation of the timing controller and the data related to a display driven by the timing controller in the internal register of the timing controller using the I2C bus, responsive to the receiving the I2C command over the AUX channel.

16. The method of claim 14 further comprising:
    selectively accessing the internal register of the timing controller using the AUX channel, responsive to receiving a native-AUX command over the AUX channel.

17. The method of claim 14 wherein the internal register of the timing controller comprises a display port configuration data (DPCD) register.

18. The method of claim 14,
wherein the internal register comprises a plurality of internal registers of the timing controller, and
wherein the using the timing controller to transmit the I2C command comprises outputting the I2C command to a particular one of the plurality of internal registers according to address bits included in the I2C command.

19. The method of claim 8,
wherein the internal register comprises:
    a first register comprising a display port configuration data (DPCD) register that comprises the first data region; and
    a second register comprising a non-DPCD register that comprises the second data region or the third data region,
wherein the non-DPCD register is not directly accessible by the command analyzer, and
wherein the transmitting the command from the AUX-I2C converter comprises outputting the command from the AUX-I2C converter to the second data region or the third data region according to address bits included in the command.

\* \* \* \* \*